United States Patent [19]

VerStrate

[11] Patent Number: 4,933,099
[45] Date of Patent: Jun. 12, 1990

[54] OIL COMPOSITIONS CONTAINING ETHYLENE COPOLYMERS

[75] Inventor: Gary W. VerStrate, Matawan, N.J.

[73] Assignee: Exxon Research and Engineering Company, Florham Park, N.J.

[21] Appl. No.: 363,871

[22] Filed: Jun. 8, 1989

Related U.S. Application Data

[63] Continuation of Ser. No. 65,961, Jun. 24, 1987, abandoned, which is a continuation of Ser. No. 360,668, Mar. 22, 1982, abandoned, which is a continuation of Ser. No. 166,769, Jul. 8, 1980, abandoned, which is a continuation-in-part of Ser. No. 2,023, Jan. 9, 1979, abandoned.

[51] Int. Cl.$^5$ .......................................... C10M 143/18
[52] U.S. Cl. .................. 252/51.5 R; 252/50; 585/12
[58] Field of Search .............. 585/12; 252/50, 51.5 R; 526/281, 282

[56] References Cited

U.S. PATENT DOCUMENTS

| | | | |
|---|---|---|---|
| 2,936,300 | 0/0000 | Lutwiler et al. | 252/51.5 R |
| 3,499,741 | 0/0000 | Sweeney | 252/51.5 R |
| 3,507,636 | 10/1973 | Sweeney | 252/51.5 R |
| 3,790,480 | 0/0000 | Campbell et al. | 252/51.5 R |

FOREIGN PATENT DOCUMENTS 2815427 of 0000 Fed. Rep. of Germany .

Primary Examiner—Jacqueline V. Howard
Attorney, Agent, or Firm—F. T. Johmann; M. B. Kapustij

[57] ABSTRACT

A lubricating oil composition comprising a major amount of mineral oil of lubricating viscosity and at least a viscosity index improving amount of an oil-soluble, saturated, ethylene copolymer, preferably an oxidatively and mechanically degraded ethylene copolymer having an ethylene content of 26–79 wt. % (35–85 mole %), a $C_3$ to $C_{18}$ higher alpha-olefin and from 0.05 to 3.0, optimally 0,8 to 2.5 wt. % of 2,5-norbornadiene and preferably at least a pour point depressing amount of lubricaitng oil pour point depressant, e.g. an alkyl fumarate vinyl acetate copolymer, whereby superior low temperature viscometrics is provided to said lubricating oil composition, compared to the same formulation using an ethylene copolymer not containing 2,5-norbornadiene.

18 Claims, No Drawings

OIL COMPOSITIONS CONTAINING ETHYLENE COPOLYMERS

This application is a Continuation of U.S. Ser. No. 065,961, filed June 24, 1987 which is a Continuation of U.S. Ser. No. 360,668, filed March 22, 1982, which is a Continuation of U.S. Ser. No. 166,769, filed July 8, 1980, which is a Continuation-in-Part of U.S. Ser. No. 2023, filed January 9, 1979, all now abandoned.

BACKGROUND OF THE INVENTION

1. Field of the Invention

This invention relates to novel lubricant additives and the preparation thereof. More particularly, it relates to improvement in the viscosity index of mineral oil of lubricating viscosity by addition thereto of a certain class of saturated ethylene copolymers which provide said mineral oil with excellent low temperature viscometric properties relative to other ethylene copolymeric viscosity-index improvers.

2. Description of the Prior Art

As is well known to those skilled in the art, lubricating oils may be evaluated by many criteria each of which relates to the proposed use of the oil. One of the more important of these criteria is the viscosity index.

It is known that the viscosity index of lubricating oils can be usefully modified by the addition of oil-soluble polymeric viscosity index (V.I.) improvers such as polyisobutylenes and ethylene copolymers including ethylene-higher alpha-olefin copolymers and terpolymers; however, such an addition can introduce chemical instability.

Recently, ethylene-propylene copolymers have become widely used as viscosity improvers in lubricating oils because of the low treat levels and improved viscometric properties. However, the market requires different molecular weight grades, which have different degrees of thickening effect - usually called Thickening Efficiencies or T.E. - so as to be operable with different viscosity mineral oils. Although the preparation of each of such copolymer grades can be by direct synthesis, the different molecular weight grades can be produced by degradation of an ethylene-propylene copolymer so as to produce lower molecular weight versions. It is advantageous to use the degradation approach since it is more economical to make a large run of copolymer in a large scale polymer plant, and then to use the copolymeric product of said run as a base material which is then broken down into lower molecular weight grades in order to meet requirements of the viscosity index improver market. There are various means to achieve such degradation including: heating an amorphous rubbery ethylene-propylene copolymer for 3 to 30 minutes at from 260° to 420° C. with the exclusion of air; extruding and heating an ethylene copolymer first at 150°-280°,C. until molten and then at a temperature of 300°-500° C. with the exclusion of air; and, by oxidative and mechanical degradation, as by mastication of ethylene-propylene copolymers in an oxygen-containing environment which copolymers are preferably free of other monomers such as dienes (see U.S. Pat. No. 3,769,216).

It is known that ethylene terpolymers which contain dienes, e.g. 5-vinyl-2-norbornene or ethylene tetrapolymer which contain both 1,4-hexadiene and 2,5-norbornadiene are not suitable for mechanical degradation as by mastication in the presence of air or oxygen whereby oxidation occurs since this degradation technique produces excessive amounts of polymeric gel particles which are oil insoluble. This problem has been overcome by use of an ethylene copolymer containing also a $C_3$ to $C_{18}$ higher alpha-olefin and from 1 to 25 wt. % of an alkyl norbornene having from 8 to 28 carbons (see German DOS 28 15 427 published October 19, 1978).

The patent literature is replete with many publications dealing with ethylene tri- and tetrapolymers containing one or more types of dienes introduced for a variety of reasons including a means to introduce branchiness into the ethylene polymer and to provide a means for crosslinking said polymer through introduction of a crosslinking agent reactive with a portion of said diene, e.g. see U.K. Patent Specification 1,195,625. Those patents, however, dealing with ethylene tri- and tetrapolymers added to a mineral oil as a viscosity index modifying additive are of limited number and are best illustrated by the specification of U.S. Pat. No. 3,790,480. This specification teaches of ethylene ter- and tetrapolymers involving ethylene, a $C_3$ to $C_{18}$ higher alpha-olefin, for example, propylene, and two classes of dienes based upon the relative polymerizabilities of each of the double bonds. In one class of dienes (as represented by 1,4-hexadiene) only one of the double bonds is readily polymerizable whereas in the other class (as represented by 2,5-norbornadiene) both double bonds are readily polymerizable. It is taught therein that an ethylene polymeric viscosity index additive for mineral oils is superior when and if it is an ethylene tetrapolymer containing both classes of dienes rather than the prior art ethylene terpolymer containing the class of dienes having only one readily polymerizable double bond. Apparently, this superiority obtains because the introduction of the second diene comonomer with two readily polymerizable double bonds into the terpolymer composition provides a significant increase in bulk polymer viscosity with only a minor increase of the inherent viscosity (see col. 8, lines 23-30) and without degradation of the property of the terpolymer to provide viscosity index improvement to mineral oils. The only discussion of the low temperature viscometrics of mineral oil solutions containing this type of ethylene terpolymer is set forth in col. 10, lines 1-3 wherein it is stated that they gave satisfactory results for 10W30 multigrade lubricating oils.

U.S. Pat. Nos. 3,499,741 and 3,681,302 discuss ethylene terpolymers containing a minor amount of a non-conjugated diene which are usefully thermally cracked to provide a pour point depressant additive for "fuel oils, diesel oils, middle distillates and other viscous hydrocarbon oils" (see col. 1, first paragraph of specifications). The aforesaid terpolymer is also useful as an additive for gasoline to modify induction system deposits (see col. 1, lines 23-25 of '741). The 9 specified non-cojugated dienes include 2,5-norbornadiene, i.e. bicyclo [2,2,1] hepta-2,5-diene] (see col. 2, line 36 of '302 also col. 2, lines 29-30 of '741) although the invention is specifically illustrated only with thermally cracked, unsaturated ethylene-propylene-hexadiene-1,5 and ethylene-propylene-cyclopentadiene terpolymers.

Unsaturation in a polymeric viscosity index improving additive is generally undesirable since the unsaturated moiety, i.e. the double or triple bond of the polymer represents a means by which the desired properties of the additive can be degraded during the lubricating of the engine, e.g. as by cleavage of the high molecular polymer into fragments no longer possessing viscosity index modifying properties or by crosslinking of said polymer to a molecular weight which is no longer mineral oil soluble provoking its precipitation onto interior engine surfaces as a varnish and/or contributing to engine lubricating oil sludge.

It is an object of this invention to provide a saturated ethylene copolymeric viscosity index improver for mineral oils of lubricating viscosity of excellent low temperature viscometrics, preferably one that can be readily oxidatively degraded to a lower molecular weight in order to achieve maximum operational properties.

SUMMARY OF THE INVENTION

It has been discovered and was the subject of my aforesaid patent application Ser. No. 2023 that an ethylene $C_3$–$C_{18}$ alpha-olefin terpolymer containing from 0.05 to 1.5, e.g. 0.8 to 1.5, preferably 0.1 to 1.0, optimally 0.2 to 0.8, wt. % of 2,5-norbornadiene (bicyclo [2.2.1] hepta-2,5-diene) is saturated, readily processable and provides to mineral oil of lubricating viscosity improved low temperature viscometrics, has compatibility in solutions of said mineral oil with pour point depressants and can be, if desired, readily reduced in molecular weight by oxidative degradation without deleterious formation of of oil-insoluble polymeric gel particles. It has been further found that the norbornadiene content could be extended to levels above those earlier specified in my Ser. No. 2023. Therefore, I include in my invention terpolymers containing 0.05 to 3.0, preferably 0.1 to 2.5, more preferably 0.7 to 2.5, e.g. 1.0 to 2.5 wt. % of the 2,5-norbornadiene.

Thus the above objective can be met by a lubricating composition which comprises according to this invention a mineral oil of lubricating viscosity and at least a viscosity index improving amount of an oil-soluble ethylene copolymer having: a number average molecular weight ($M_n$) of at least 5,000, preferably from 10,000 to 100,000; and a thickening efficiency in the range of 1.0 to 3, preferably 1.2 to 2.8, when compared to polyisobutylene having a viscosity average molecular weight ($M_v$) of 20,000; and containing 26–79 weight percent (35–85 mole percent) of ethylene, of at least one $C_3$ to $C_{18}$ alpha-olefin, such as propylene, and from 0.05 to 3.0, preferably 0.1 to 2.5, weight percent of 2,5-norbornadiene (said weight percents totaling 100), and preferably at least a pour point depressing amount of a lubricating oil pour point depressant.

In a preferred embodiment, the ethylene copolymer is oxidatively and mechanically degraded, preferably by mastication in the presence of air at a temperature of from about 95° C. to 260° C. for from 0.25 to 20 hours whereby the thickening efficiency is reduced from a value greater than about 3, e.g. about 4, to within the range of 1.0 to 3.0, preferably from 1.2 to 2.8, and the oxygen content of said ethylene copolymer is from about 0.005 to 6, preferably 0.05 to 3 wt. % based on the total weight of said copolymer.

The mechanically degraded and oxidized copolymer can be reacted with polyamines for dispersancy whereby multifunctionalization is provided, i.e. said copolymer contains from about 0.005 to 4, preferably 0.05 to 2, percent by weight of nitrogen, based on the total weight of said copolymer.

Thickening efficiency (T.E.) is defined as the ratio of the weight percent of a polyisobutylene (sold by Exxon Chemical Co., New York, NY as PARATONE N ®) having a Staudinger Molecular Weight of 20,000, required to thicken a solvent extracted neutral mineral lubricating oil, having a viscosity of 150 SUS at 37.8° C., a viscosity index of 105 and an ASTM pour point of −17.8° C., (Solvent 150 Neutral) to a viscosity of 12.4 centistokes at 98.9° C., to the weight of a test copolymer required to thicken the same oil to the same viscosity at the same temperature.

Generally, the amount of the copolymer added to said mineral oil ranges from 0.1 to 15, preferably 0.2 to 7, weight percent based on the total of the lubricating composition.

DESCRIPTION OF THE INVENTION

Ethylene tetrapolymers containing ethylene, a longer chain alpha-olefin, 1,4-hexadiene and 2,5-norbornadiene monomers are known as V.I. improvers for mineral oil compositions which tetrapolymer provides suitable low temperature performance and is itself readily processable though it is an unsaturated copolymer.

In accordance with the teachings of this invention, 2,5-norbornadiene appears to copolymerize with ethylene and the $C_3$–$C_{18}$ higher alpha-olefins in a manner so as to provide a readily processable saturated copolymer, i.e. with an iodine number less than 0.8 which is indistinguishable from the copolymer containing no diolefin with long chain branching, whereby the terpolymer's additive activity in mineral oil provides for excellent low temperature viscometrics and yet as needed said terpolymer can be masticated to a T.E. so as to provide for enhanced shear stability of the additive for said mineral oil.

Although not being bound by theory it appears that the 2,5-norbornadiene serves multiple roles providing long chain branching, which is desirable as discussed in the prior art, and by acting to reduce the lengths of ethylene sequences in the polymer chain which ultimately reduces agglomeration and lowers oil solution viscosity at low temperature. It appears likely that the 2,5-norbornadiene enters the chain by more than one mechanism; one of which does not lead to branching. The absence of residual olefin, i.e. unsaturation permits oxidative mastication to reduce molecular weight. Only the 2,5-norbornadiene structure appears capable of performing these varied functions. For the purpose of forming long-chain branches and leaving no olefinic residue both double bonds should be readily polymerizable. For the purpose of reducing ethylene sequence lengths the olefin should be sterically hindered enough to polymerize with ethylene only and not higher alpha-olefins, and should readily polymerize with ethylene with an effective reactivity ratio product near zero. (See F. P. Baldwin, G. Ver Strate, *Rubber Reviews*, 44, 709 (1972) for a definition of reactivity ratio product and kinetics data on various structures).

Since gellation in a continuous flow stirred reactor should occur after incorporation of a diene mole fraction equal to 1/(2DPw) (where DPw is the weight average degree of polymerization in the absence of diene) and this number for the polymers of Example 1 is ca. 0.01%, which is far exceeded by those polymers, there must be multiple polymerization mechanisms. It appears likely that the 2,5-norbornadiene enters the chain forming a nortricyclone structure; similar structures appear possible with vinyl 1-cyclohexene so that too may be confirmed through experimentation to provide a comparably unique and valuable terpolymer as one obtains with the terpolymer described in this invention. This chain structure may amount to as much as 90% of the 2,5-norbornadiene incorporation into the polymer. Without this twofold polymerization mechanism inadequate diene could be incorporated into the polymer to significantly influence the sequence distribution.

The longer chain alpha-olefins which may be used individually or as a mixture in the preparation of the ethylene copolymers used in the practice of this invention are those monomers containing from 3 to about 18 carbon atoms. These alpha-olefins may be linear, or branched where the branching occurs three or more carbon atoms from the double bond. While a single olefin is preferable, mixtures of $C_3$ to $C_{18}$ olefins may be employed. It is preferred, however, that the ethylene monomer be copolymerized with propylene.

In general, the ethylene, $C_3$-$C_{18}$ higher alpha-olefin and 2,5-norbornadiene copolymers used in accordance with this invention are derived from about 26 to 80% by weight of ethylene, about 20 to 74% by weight of $C_3$-$C_{18}$ alpha-olefins and 0.05 to 3.0; preferably 0.7 to 2.5 wt. % of 2,5-norbornadiene.

Preferably the copolymers are derived from about 40 to 65% by weight ethylene, about 35 to 60 wt. % of a $C_3$-$C_{18}$ alpha-olefin and about 0.7 to 2.5% by weight of norbornadiene, e.g., a copolymer derived from 43 wt. % of ethylene, 56.2 wt. % of propylene and 0.8 wt. % of norbornadiene.

The copolymers of this invention may be characterized by the following properties:

TABLE I

|  | Broad Range | Preferred Range | Measured By |
|---|---|---|---|
| Ethylene Content | 26-79 wt. % | 40-65 wt. % | Infrared |
| 2,5-Norbornadiene Content | 0.05-3.0 wt. % | .7-2.5 wt. % | * |
| Degree of Crystallinity | 0-37% | 0-15% | X-Ray |
| $\overline{M}_n \times 10^{-3}$ | 5-300 | 10-70 | ** |
| $\overline{M}_w \times 10^{-3}$ | 10-800 | 10-400 | light scattering |

**Membrane Osmometry
*Analysis for 2,5-norbornadiene is difficult due to the absence of easily identifiable spectral peaks of adequate intensity. Use of refractive index, a technique well known (I. J. Gardner, G. Ver Strate, Rubber Chem. Tech., 46, 1019 (1973)) for similar dienes, indicates extensive incorporation. The absence of unsaturation in the copolymer by iodine number indicates complete utilization of the second olefinic residue, which should polymerize more difficultly than the first, therefore 100% conversion of the feed is likely. The contents have been calculated on that basis.

These ethylene copolymers may be readily prepared by means well known in the prior art by forming a mixture of the requisite three monomer components containing the above components.

In general, these copolymers can be produced by a catalyst composition which comprises a principal catalyst consisting of a transition metal compound from Groups IVb, Vb and VIb of the Periodic Table of the Elements, particularly compounds of titanium and vanadium, e.g. $VOCl_3$, and organometallic reducing compounds from Groups IIa, IIb and IIIa, particularly organo-aluminum compounds, e.g. $(C_2H_5)_3 Al_2Cl_3$, which are designated as cocatalysts. Examples of suitable catalysts and preferred reaction conditions are shown in U.S. Pat. No. 3,551,336.

Polymerization may be effected to produce copolymers by passing ethylene, an alpha $C_3$-$C_{28}$ monoolefin, preferably propylene, 2,5-norbornadiene and hydrogen into a liquid inert-diluent-solvent reaction medium containing catalyst and cocatalyst in catalytic amounts. The nonreactive reaction medium may be an aromatic hydrocarbon such as toluene, a saturated aliphatic hydrocarbon such as heptane, pentane, and hexane, or a chlorohydrocarbon such as tetrachloroethylene. All steps in this reaction should preferably be carried out in the absence of oxygen, moisture, carbon dioxide or other harmful materials. Preferably, all reactants and catalysts may be pure and dry and blanketed with inert gas such as nitrogen.

During polymerization, the reaction mixture may be agitated and maintained at temperatures of −40° to 100° C., preferably −10° C. to 70° C., optimally about 30° C. and pressures of 0-1000 psig, preferably 0-300 psig, optimally 60 psig, during a period of 1-300 minutes, preferably 3-60 minutes, optimally 15 minutes. At the end of this period, the reaction mixture may be worked up to separate the product copolymer or the mixture may be used as such for degradation.

OXIDATION AND MECHANICAL DEGRADATION OF THE COPOLYMER

It has been discovered that these ethylene copolymeric viscosity-index improving additives of the invention can be readily degraded, i.e. reduced in molecular weight, by mastication in air such as by a mechanical shearing machine, e.g. a Banbury mixer. This process results in shear stable ethylene copolymers which when incorporated in lubricating oils provide "stay-in-grade" performance which performance is important if not essential for lubrication of modern high performance engines.

This finding that these materials may be masticated in a high shear machine is surprising since commercially available terpolymers having over 1 wt. % cyclic diolefin, e.g. Vistalon 2504 sold by Exxon Chemical, Houston, Texas (ethylene-propylene-2,ethylidene-5-norbornene terpolymer) or tetrapolymers having over 1 wt. % linear diolefin, e.g. Nordel 1320 sold by E. I. duPont de Nemours of Wilmington, Delaware (tetrapolymer of ethylene-propylene-1,4-hexadiene and 2,5-norbornadiene) form oil-insoluble gel upon mastication in air. This gel formation is not acceptable since the oxidized-masticated terpolymers are each insoluble in mineral oil and are no longer useful as viscosity modifiers.

For the purposes of this invention, the mechanical-oxidative degradation of the ethylene copolymer may be done with a single piece of equipment, or may be done in stages. It is preferred to operate in the absence of solvent or fluxing oil so the ethylene copolymer is readily exposed to air as taught in French Application 75.23806. Useful equipment includes Banbury mixers and mills having adjustable gaps, which devices may be enclosed in jacketed containers through which a heating medium may be passed such as superatmospheric steam, or heated DOWTHERM ®. When degradation has reached a desired level, as determined by oxygen uptake and reduction in thickening efficiency (T.E.) as defined before, a fluxing oil may be added to the degraded ethylene copolymer. Usually enough oil is added to provide a concentration of degraded copolymer in the range of about 5 weight percent to 50 weight percent based on the weight of the total resulting solution. The resulting oil solution may thereafter be utilized as an article of commerce as a lubricant additive or readily incorporated into the lubricating oil.

Useful temperatures for mechanical-oxidative degrading of the ethylene copolymers are in the range of about 95° C. to 260° C. The time required to achieve satisfactory results will depend on the type of degrading or mastication equipment, the temperature of degrading, and particularly the speed of rotation if using a blade mixer as the degrading or masticating device. In this regard, the Bramley Beken Blade Mixer has been found to be particularly useful in providing in a single piece of equipment, the desired degree of mastication or milling and oxidative degradation. This mixer, which is equipped with a variable speed drive, has two rollers, fitted with helically disposed knives geared so that one roller revolves at one-half the speed of the other. The rollers are journaled in a jacketed reactor having two hemispherical halves in its base, which conform to the radii of the two rollers. Superheated steam, or heated DOWTHERM®, may be circulated through the jacket to provide the desired temperature. With this mixer satisfactory reductions in thickening efficiency may be obtained in from 0.25 to 20 hours in the temperature range of about 95° C. to 260° C.

Instead of using a fluxing oil, other inert solvents can be used in preparing a fluid solution of the ethylene copolymer which inert solvents include a liquid hydrocarbon such as naphtha, hexane, cyclohexane, dodecane, mineral oil, biphenyl, xylene or toluene, a lubricating oil of the solvent neutral type, a white lubricating oil, chlorinated solvents such as dichlorobenzene, isopars, etc. The amount of the solvent is not critical so long as a sufficient amount is used to result in the fluid solution of the ethylene copolymer so as to facilitate the mechanical-oxidative degradation. Such a solution as earlier described usually contains from about 50 to about 95 weight percent of the solvent.

The oil-soluble ethylene copolymeric additives including the oxygen and nitrogen-containing derivatives of this invention are incorporated in lubricating oil compositions, e.g., automotive or diesel crankcase lubricating oil, in at least viscosity index improving amounts and generally in concentrations within the range of about 0.1 to 15 weight percent, preferably 0.2 to 7 weight percent of the total composition.

Further, these oil-soluble degraded ethylene copolymeric V.I. improving materials of the invention can be derivatized into multifunctional V.I. improvers by addition of sludge dispersant activity. This is readily accomplished by reaction with or grafting of amine compounds into said ethylene copolymeric materials of the invention.

Useful amine compounds for introducing sludge dispersant activity include mono- and polyamines of about 2 to 60, e.g. 3 to 20, total carbon atoms and about 1 to 12, e.g. 2 to 6, nitrogen atoms in the molecule, which amines may be hydrocarbyl amines or may be hydrocarbyl amines including other groups, e.g. hydroxy groups, alkoxy groups, amide groups, imidazoline groups, and the like. Preferred amines are aliphatic saturated amines, including those of the general formulae:

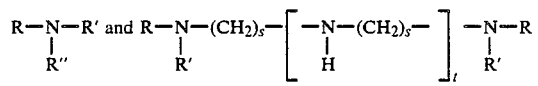

wherein R, R' and R" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy or amino alkylene radicals; and $C_1$ to $C_{12}$ alkylamino $C_2$ to $C_6$ alkylene radicals; s is a number of from 2 to 6, preferably 2 to 4; and t is a number of from 0 to 10, preferably 2 to 6.

Nonlimiting examples of suitable amine compounds include: mono-, di- and tritallow amines; 1,2-diaminoethane; 1,3-diaminopropane; 1,4-diaminobutane; 1,6-diaminohexane; diethylene triamine, triethylene tetraamine, tetraethylene pentamine; 1,2-propylene diamine; di-(1,2-propylene) triamine; di-(1,3-propylene) triamine; N,N-dimethyl-1,3-diaminopropane; N,N-dip(2-aminoethyl) ethylene di-amine; N,N-di-(2-hydroxyethyl)-1,3-propylene diamine; 3-dodecyloxypropylamine; N-dodecyl-1,3-propane diamine, tris-hydroxymethyl methylamine, diisopropanol amine and diethanolamine.

Other useful amine compounds include: alicyclic diamines such as 1,4-di-(aminomethyl) cyclohexane, and heterocyclic nitrogen compounds such as imidazolines and N-aminoalkyl piperazines of the general formula:

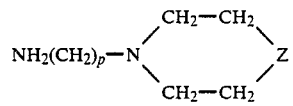

wherein Z is oxygen or NG and G is independently selected from the group consisting of hydrogen and Ω-aminoalkylene radicals of from 1 to 3 carbon atoms; and p is an integer of from 1 to 4. Nonlimiting examples of such amines include 2-pentadecyl imidazoline; N-(2-aminoethyl) piperazine; N-(3-aminopropyl) piperazone; N,N'-di-(2-aminoethyl) piperazine; and n-propyl aminomorpholine.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylene-tetramine, tetraethylene pentamine and isomeric piperazines. Low cost poly(ethylene amines) compounds having a composition approximating tetraethylene pentamine are available commercially under the trade name Polyamine 400 (PA-400) marketed by Jefferson Chemical Co., New York, NY. Similar materials may be made by the polymerization of aziridine, 2-methyl aziridine and azetidine.

Still other amines separated by hetero atom chains such as polyethers or sulfides can be used.

Introduction of the sludge dispersant activity can be by various means including: reacting the oil-soluble ethylene copolymer with an oxygen-containing gas and said amine compound at a temperature of from about 130° C. to about 300° C. while mechanically degrading said copolymer, forming an anion of said oxidized ethylene copolymer and reacting said anion with acrylonitrile and thereafter derivitizing the reaction product with amines; and, reacting said oxidized ethylene copolymer with said amines. alone in lubricant compositions which is predominantly a mineral oil of lubricating viscosity or they can be employed in combination with other viscosity index improvers. If desired, the copolymers may be employed in combination with other additives, for example, preferably pour point depressants; ashless dispersants such as the reaction product of polyisobutenyl succinic anhydride with tetraethylene pentamine, detergent type additives such as calcium nonyl sulfurized phenate and magnesium phenyl sulfonate; zinc antioxidants such as dialkyl dithiophosphate, etc. It is contemplated that the invention polymers can be blended with other polymers so as to impart various desired properties thereto.

Mineral oil of lubricating viscosity refers to those materials obtained by distilling crude oil under vacuum or otherwise synthesized to provide a lubricating oil suitable for the lubrication of internal combustion engines and hydraulic applications (particularly those involved in intermittent operation). Although it would be possible to classify these mineral oils of lubricating viscosity by Society of Automotive Engineers SAE J 300d viscosity classification, however, for the purposes of this disclosure said mineral oil has a viscosity range: at $-18°$ C. of 600 to 9600, preferably from 1200 to 2400, centipoises as measured by ASTM Procedure D 2602; and, a viscosity range at $99°$ C. of 5.7 to 22.7 centistokes as measured by ASTM Procedure D445.

It is a feature of this invention that significant improvement in low temperature viscometrics may be achieved without undesirable effect on pour point when a pour point depressant is present in a formulated oil. This improvement may be particularly noted when the lubricating composition contains the pour point depressant in amount of 0.1 wt. % to 1.0 wt. %, preferably 0.4 wt. %. Illustrative pour point depressants which may be present in the compositions of this invention include chlorinated wax naphthalenes condensates as described in U.S. Pat. No. 2,174,246, $C_{10}$–$C_{18}$ alkyl methacrylate polymers as described in U.S. Pat. No. 2,091,627 and 2,100,993, $C_{10}$–$C_{18}$ alkyl acrylates, copolymers of di-n-alkyl fumarate and vinyl acetate as disclosed in U.S. Pat. No. 2,936,300 and 3,048,479, ethylene-vinyl acetate copolymers, and copolymers of styrene and alpha-olefins and copolymers of styrene and maleic anhydride.

DESCRIPTION OF THE PREFERRED EMBODIMENTS

Practice of this invention may be illustrated by the following examples which show how the invention may be utilized. In these examples, as elsewhere in this specification, all parts are by weight unless specifically indicated otherwise.

ETHYLENE COPOLYMERS CONTAINING NORBORNADIENE

A series of ethylene-propylene copolymers were produced with varying ethylene, propylene and/or norbornadiene content. These copolymers, of which there are ten examples, are designated hereafter as EPNBD—1 through 10. These EPNBD copolymers are prepared from ethylene, propylene and norbornadiene by varying the feed ratio of the three comonomers in the polymerization process carried out essentially as follows (EPNBD-1 copolymer is produced under these specific conditions with all parts being parts by weight): 3.0 parts of ethylene, 6.8 parts of propylene, 0.006 parts of norbornadiene and 45 parts per million of hydrogen was admitted to the reactor with 100 parts of n-hexane, 0.009 parts of vanadium oxychloride and 0.032 parts ethyl aluminum sesquichloride. The catalyst composition was characterized by a molar ratio of Al/V of 4. Residence time was about 13 minutes. Polymerization temperature was $32°$ C. and the pressure was 60 psig. Steam distillation yielded the solvent-free ethylene copolymer of the invention. Copolymers EPNBD 2 to 10 were prepared by appropriate change in the feedstock ratio. The specific compositions are set forth hereafter:

| EPNBD Copolymer | Wt. % Ethylene | Wt. % Propylene | Wt. % Norbornadiene |
|---|---|---|---|
| 1 | 45 | 54.9 | 0.1 |
| 2 | 43 | 56.8 | 0.2 |
| 3 | 43 | 56.8 | 0.2 |
| 4 | 44 | 55.6 | 0.4 |
| 5 | 43 | 56.2 | 0.8 |
| 6 | 43 | 56.2 | 0.8 |
| 7 | 42.5 | 56.3 | 1.2 |
| 8 | 44.8 | 52.9 | 2.3 |
| 9 | 45.1 | 52.6 | 2.3 |
| 10 | 45.2 | 52.5 | 2.3 |

ETHYLENE-PROPYLENE COPOLYMERS

An ethylene-propylene copolymer containing 46 wt. % ethylene content was used for comparative purposes. This commercially available copolymer was produced generally according to U.S. Pat. No. 3,697,429 and designated herein as EPC-1.

EXAMPLE 1

In this example, a comparison of oil blend characteristics of a reference oil containing the copolymers of the invention, i.e. EPNBD 2–10, is made with samples of said oil containing the ethylene-propylene copolymers of the prior art, i.e. EPC-1. The reference oil is a formulated test oil consisting of solvent neutral oils and a pour depressant to provide a blend having a viscosity at $99°$ C. of ca. 6.7 cs. Table II illustrates the effect of both types of ethylene copolymers on the blend characteristics of said reference oil when sufficient copolymer is added to provide a $98.9°$ C. viscosity of about 40 centistokes.

TABLE II[1]

| Oil Blend | Copolymer Added | Wt. % Norbornadiene | Mooney Visc. at 100° C. | T.E. | Shear Viscosity Pa.s MRV[2] −30° C. | CCS[3] −18° C. | Sonic[4] Shear % Breakdown | Bulk Visc.[5] 100° C. MPa.s |
|---|---|---|---|---|---|---|---|---|
| I-A | EPNBD-2 | 0.2 | 38.0 | 2.73 | 41.2 | 2.76 | 32.2 | 1.8 |
| I-B | EPNBD-3 | 0.2 | 47.5 | 3.00 | 56.0 | 2.63 | 38.0 | 10 |
| I-C | EPNBD-4 | 0.4 | 51.0 | 2.94 | 44.8 | 2.69 | 34.9 | 10 |
| I-D | EPNBD-5 | 0.8 | 53.0 | 2.74 | 36.7 | 2.74 | 32.1 | 10 |
| I-E | EPNBD-6 | 0.8 | 46.0 | 2.51 | 31.2 | 2.69 | 29.5 | 10 |
| I-F | EPC-1 | 0 | 41.8 | 2.87 | 53.9 | 2.85 | 36.6 | .1 |
| I-G | EPNBD-7 | 1.2 | 22.0 | 2.02 | 33.6 | 2.63 | 16.2 | .26 |
| I-H | EPNBD-8 | 2.3 | 48.0 | 2.26 | 34.9 | 2.67 | 25.6 | 1.6 |
| I-I | EPNBD-9 | 2.3 | 41.5 | 2.13 | 33.0 | 2.66 | 23.7 | 1.0 |
| I-J | EPNBD-10 | 2.3 | 22.0 | 1.71 | 35.1 | 2.76 | 13.6 | .1 |
| I-K | no | — | — | | 19.0 | | | |

TABLE II[1]-continued

| Oil Blend | Copolymer Added | Wt. % Nor-bornadiene copolymer | Mooney Visc. at 100° C. | T.E. | Shear Viscosity Pa.s MRV[2] −30° C. | CCS[3] −18° C. | Sonic[4] Shear % Breakdown | Bulk Visc.[5] 100° C. MPa.s |
|---|---|---|---|---|---|---|---|---|

[1] All oils formulated to a viscosity of 12.4 cs at 99° C. measured in Ubbelohde viscometer
[2] Couette type viscometer as described by ASTM Committee D-2 RDD VII and VIIC operated at ca. 100 Pa shear stress, MiniRotary Viscometer = MRV and Pa.s means Pascal seconds
[3] Couette type viscometer available from Cannon Instrument Co., P.O. Box 16, State College, PA 16801, operates at ca. .01MPa.CCS = Cold Cranking Simulator measured by ASTM Test Method D-2607-72
[4] $\frac{\lambda_{before} - \lambda_{after}}{\lambda_{before}} \times 100$ where $\lambda$ is the viscosity measured at 99° C. in a Ubbelohde viscometer
[5] Measured as one-third of the tensile viscosity at a stress of ca. 1.KPa. (G. Ver Strate, W. Graessley, Rubber Chem. Technol.) a typical tetrapolymer of U. S. Pat. No. 3,790,480 has a viscosity of 7MPa.s in this test, e.g. Nordel 2522.

The data of Table II show that it is possible to prepare a series of 2,5-norbornadiene containing ethylene terpolymers which exhibit the bulk viscosity characteristics of the tetrapolymers of U.S. Pat. No. 3,790,480 in the absence of a diene of the class represented by 1,4-hexadine and furthermore that these terpolymers of the invention provide mineral oils of lubricating viscosity with useful and surprising low temperature viscosity characteristics compared to those provided by ethylene-propylene copolymers. Such low temperature properties were heretofore obtainable only by incorporating the class of dienes which left residual unsaturation in the polymers of the prior art (both terpolymers and tetrapolymers of ethylene as described in U.S. Pat. No. 3,790,480) or did not provide significant long chain branching as in the ethylene terpolymer containing a $C_1$–$C_{21}$ alkyl norbornene previously referenced herein.

More specifically, Oil Blend I-F contained an ethylene-propylene copolymer with a bulk viscosity of 0.1, while all the terpolymers with norbornadiene had viscosities considerably higher, except for I-J, where the T.E. of the polymer was only 1.71. Thus, the data indicates that including norbornadiene, for a given T.E., will significantly increase the bulk viscosity. As Table II also shows, those polymers with the higher norbornadiene contents, e.g. 0.8 and higher, gave significantly lower viscosities at −30° C. which is desirable. These polymers generally had lower T.E. values, although since all of the oil blends were made up of 12.4 cs. at 99° C., more of the lower T.E. polymer is required. However, comparing I-D with I-A where the T.E. values were almost identical, namely 2.74 and 2.73 respectively, it is seen that I-D gave the better −30° F. shear viscosity of 36.7 indicating the desirability of a higher norbornadiene content of 0.8 and higher.

As earlier discussed, the copolymers are usefully incorporated into mineral oils of lubricating viscosity in at least viscosity improving amounts, generally from 0.1 to 15, e.g. 0.3 to 6 weight percent for lubricating oil compositions; however, when said copolymer is placed into commerce as a concentrate in said mineral oil, the copolymer content ranges from 6 to 45 weight percent (all weight percents are based on the total weight of the composition or concentrate). Thus in summary, the copolymer (including the oxidized type) of the invention in said mineral oil ranges from 0.1 to 45 wt. % of said copolymer in a major amount of said mineral oil of lubricating viscosity, generally from 55 to 99 wt. %.

These mineral oils of lubricating viscosity are mineral oils having undergone extraction to remove harmful products by processes known in the art such as phenol extraction. The resulting oils useful in this invention have viscosity indices (V.I.) of at least 85 as measured by ASTM D2270-74. Other mineral oils used for other purposes such as for fuel are not extracted and have V.I.s lower than 85.

The invention in its broader aspect is not limited to the specific details shown and described and departures may be made from such details without departing from the principles of the invention and without sacrificing its chief advantages.

What is claimed is:

1. A lubricating oil composition comprising major amount of mineral lubricating oil of lubricating viscosity and at least a viscosity index improving effective amount of oil-soluble saturated V.I. improving terpolymer consisting essentially of from 26–79 wt. % ethylene, from 0.7 to 3.0 wt. % 2,5-norbornadiene, the balance being at least one $C_3$–$C_{18}$ alpha olefin, said terpolymer having a number average molecular weight in the range of about 5,000 to 300,000 and being oxidatively degradable at temperatures of from 95° to 200° C. without gel formation.

2. A lubricating oil composition according to claim 1, wherein said terpolymer has a thickening efficiency in the range of 1.0 to 3 when compared to polyisobutylene having a viscosity average molecular weight ($M_v$) of 20,000.

3. A lubricating oil composition according to claim 1, wherein said terpolymer has a thickening efficiency of 1.2 to 2.8 and a $M_n$ of from about 10,000 to 100,000 weight percent.

4. A lubricating oil composition according to claim 3, wherein the amount of said 2,5-norbornadiene is about 0.8 to 1.5 wt. %.

5. A lubricating oil composition according to claim 4, wherein the amount of said 2,5-norbornadiene is about 0.8 wt. %.

6. A lubricating oil composition according to claim 1, wherein said higher olefin is propylene and contains at least a pour depressing amount of a lubricating oil pour depressant.

7. A lubricating oil composition according to claim 3, wherein said terpolymer has a number average molecular weight which ranges from about 10,000 to 100,000, a thickening efficiency in the range of 1.2 to 2.4, and said alpha-olefin is propylene in an amount ranging from 6 to 73 weight percent.

8. A lubricating oil composition according to claim 1, wherein said terpolymer has been reduced in molecular weight by mastication in air.

9. A lubricating oil composition according to claim 1, wherein said terpolymer is a multifunctional additive and has sludge dispersant activity resulting from reaction with a nitrogen compound.

10. A lubricating oil composition according to claim 9, wherein said terpolymer has an oxygen content of 0.005 to 6 wt. % and a nitrogen content ranging from about 0.01 to 0.5 wt. %.

11. A lubricating oil composition according to claim 10 wherein said nitrogen compound is an alkylene polyamine of 2 to 6 nitrogens per molecule.

12. A concentrate comprising a major proportion of mineral oil of lubricating viscosity and from 6 to 45 wt. % of oil-soluble, saturated ethylene terpolymer consisting essentially of 26–79 weight percent ethylene, from 0.7 to 3.0 weight percent 2,5-norbornadiene, the balance being at least one $C_3$–$C_{18}$ alpha-olefin, said ethylene terpolymer having a number average molecular weight ($M_n$) of at least 5,000, a thickening efficiency in the range of 1.0 to 3.0 when compared to polyisobutylene having a viscosity average molecular weight ($M_v$) of 20,000, and being oxidatively degradable at temperatures of 95° C. to 260° C. without gel formation.

13. A concentrate according to claim 12, wherein the amount of said norbornadiene is about 0.8 to 1.5 wt. %.

14. A concentrate according to claim 13, wherein the amount of said norbornadiene is about 0.8 wt. %.

15. A concentrate according to claim 12, wherein said terpolymer has been reduced in molecular weight by mastication in air.

16. A concentrate according to claim 12, wherein said terpolymer is a multifunctional additive and has sludge dispersant activity resulting from reaction with a nitrogen compound.

17. A concentrate according to claim 16, wherein said terpolymer has an oxygen content of 0.005 to 6 wt. % and a nitrogen content ranging from about 0.01 to 0.5 wt. %.

18. A concentrate according to claim 17, wherein said nitrogen compound is an alkylene polyamine of 2 to 6 nitrogens per molecule.

* * * * *